Patented Aug. 12, 1947

2,425,509

UNITED STATES PATENT OFFICE 2,425,509

CHLORINATION

Albert M. Clifford and John R. Long, Stow, Ohio, assignors to Wingfoot Corporation, Akron, Ohio, a corporation of Delaware No Drawing. Application August 25, 1942,
Serial No. 456,087

3 Claims. (Cl. 260—342.6)

The present invention relates to an improved method of chlorinating maleic anhydride to produce dichlorosuccinic anhydride.

Chlorine does not add readily to the carbon-to-carbon double bond of maleic anhydride. When chlorine is bubbled through molten maleic anhydride at temperatures above 100° C. and in the presence of a catalyst, such as iron chloride, addition to maleic anhydride is too slow for efficient commercial operation because chlorine is not appreciably soluble in the maleic anhydride or its chlorinated products at the reaction temperature. On the other hand, if the required amount of liquid chlorine and maleic anhydride is heated in a high pressure bomb, there is little or no reaction until the reactants have attained a somewhat critical temperature above about 80° C.; and after the reaction starts, it proceeds with explosive violence giving a mixture of products.

According to the process of this invention the chlorination of maleic anhydride may be conducted rapidly and at the same time controlled to give a good yield of dichlorosuccinic anhydride. This is accomplished by forcing chlorine under pressure into molten maleic anhydride at the reaction temperature until one mol of chlorine has reacted for each mol of maleic anhydride used. The chlorination under pressure is carried out in a suitable closed vessel. The contents of the reaction vessel are advantageously maintained at a pressure of at least ten pounds per square inch. The pressure may be increased from this minimum all the way up to the vapor pressure of chlorine at reaction temperature.

Apparently, some dehydrochlorination takes place because a small amount of hydrogen chloride is formed as a by-product of this reaction. The amount of hydrogen chloride formed depends on various factors, such as reaction temperature, presence of metallic salts, the amount of dichlorosuccinic anhydride present, etc. Although the chlorine may be forced into the reaction vessel against the pressure exerted by the liberated hydrogen chloride, the hydrogen chloride is preferably continuously vented from the reaction vessel during chlorination while chlorine is being introduced into the reaction vessel.

The maleic anhydride is maintained in a molten condition during the chlorination, and temperatures up to 180° C. and even as high as 200° C. may be used to advantage.

It has been found that the presence of catalysts accelerates the chlorination. Various of these may be used in carrying out the process of this invention. Ferric chloride is a preferred catalyst. Other metal halides, organic materials, etc., may be used.

In carrying out the operation, the maleic anhydride, preferably without any solvent, is thoroughly admixed with the catalyst and is heated to the temperature at which the reaction sets in. This is ordinarily a temperature above about 90° C. The exact temperature will, of course, depend upon the pressure used and the catalyst employed, etc. The reaction mixture is preferably heated to the desired temperature of reaction before introducing any chlorine.

The progress of the reaction may be followed by the weight of chlorine absorbed which can be obtained from the weight of chlorine introduced into the reaction vessel and the weight of chlorine condensed out of the exit gases.

The rate at which the gases are bled from the vessel during the reaction will ordinarily vary depending on the rate of hydrogen chloride evolution. Usually no hydrogen chloride is liberated in the initial stages of the reaction. The composition of the gases bled from the reaction vessel may be determined roughly by leading the gases through two bubbler flasks having between them a condenser cooled in a bath of solid carbon dioxide and acetone to condense out the chlorine. The rate of bubbling in the first bubbler gives the rate the gases are bled off, and the rate of bubbling in the second bubbler gives the rate at which hydrogen chloride is given off from the reaction vessel.

According to a preferred method of operation, if the gases are bled from the reaction vessel to remove hydrogen chloride, they will be taken off through a suitable condensing tube in which the chlorine gas is condensed and returned to the reaction mixture, and only a small amount of chlorine evolved will pass out through the bleed valve with hydrogen chloride.

The following example is illustrative of the invention:

Six mols of maleic anhydride and 3 grams of iron chloride, as a catalyst, were placed in a pressure vessel and heated to 150° C. in an oil bath. Chlorine was then introduced into the reaction vessel through an inlet pipe which caused it to bubble up through the reacting mass. The chlorine was introduced until the pressure rose to 50 pounds per square inch. As the introduction of chlorine was continued, the temperature after about ten minutes rose to about 180° C. The vessel was then cooled to bring the temperature back to about 150–160° C. The bleed valve was then opened slightly to allow a small stream of the gases to escape, thus removing hydrogen chloride. The inlet valve was adjusted to maintain the pressure between 50 and 70 pounds per square inch. The temperature was kept at 140–160° C. At the end of several hours 560 grams of chlorine had been introduced into the reactor and about 120 grams had been recovered from the exit gases. A good yield of dichlorosuccinic anhydride was obtained in this way.

What we claim is:

1. A method of preparing dichlorosuccinic anhydride which comprises treating molten maleic anhydride with gaseous chlorine at a temperature of at least 140° C., said chlorine being introduced under a pressure sufficient to maintain a gauge pressure of at least 10 pounds per square inch in all parts of the reaction vessel, and maintaining said pressure until the maleic anhydride is substantially completely converted to dichlorosuccinic anhydride.

2. A method of preparing dichlorosuccinic anhydride which comprises intimately mixing molten maleic anhydride and gaseous chlorine at a temperature of at least 140° C., said chlorine being introduced under a pressure sufficient to maintain a gauge pressure of at least ten pounds per square inch in all parts of the reaction vessel while gradually releasing the hydrogen chloride formed, and maintaining the pressure of 10 pounds per square inch within the reaction vessel until the maleic anhydride is substantially completely converted into dichlorosuccinic anhydride.

3. A method of preparing dichlorosuccinic anhydride which comprises heating molten maleic anhydride intimately mixed with gaseous chlorine to a temperature sufficient to induce chlorination, introducing chlorine into the reaction vessel at a pressure sufficient to maintain a gauge pressure of at least 10 pounds per square inch in all parts of the reaction vessel, and maintaining said pressure until the maleic anhydride is substantially completely converted to dichlorosuccinic anhydride.

ALBERT M. CLIFFORD.
JOHN R. LONG.

REFERENCES CITED

The following references are of record in the file of this patent:

UNITED STATES PATENTS

| Number | Name | Date |
|---|---|---|
| 2,028,383 | Dvornikoff | Jan. 21, 1936 |
| 2,010,685 | Bass | Aug. 6, 1935 |
| 2,168,260 | Heisel et al. | Aug. 1, 1939 |
| 2,210,834 | Heisel et al. | Aug. 6, 1940 |
| 1,315,542 | Curme | Sept. 9, 1919 |
| 1,231,123 | Brooks | June 26, 1917 |
| 1,248,065 | Blanc | Nov. 27, 1917 |

FOREIGN PATENTS

| Number | Country | Date |
|---|---|---|
| 43,419 | Russia | 1935 |

OTHER REFERENCES

Beilstein, Organische Chemie, Vierte Auflage Band XVII, pages 410, 411.

Chemical Abstracts, volume 31, page 7447.

Berichte, volume 13, pages 1670–71.

Journal Praktische Chemie (2), volume 46, pages 392–393.

Groggins, Unit Processes, in Organic Synthesis, McGraw-Hill, 1935, 1st edition, pages 191–197, 201–204.